(12) United States Patent
Chen et al.

(10) Patent No.: US 11,488,577 B2
(45) Date of Patent: Nov. 1, 2022

(54) TRAINING METHOD AND APPARATUS FOR A SPEECH SYNTHESIS MODEL, AND STORAGE MEDIUM

(71) Applicant: BAIDU ONLINE NETWORK TECHNOLOGY (BEIJING) CO., LTD., Beijing (CN)

(72) Inventors: Zhipeng Chen, Beijing (CN); Jinfeng Bai, Beijing (CN); Lei Jia, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 266 days.

(21) Appl. No.: 16/907,006

(22) Filed: Jun. 19, 2020

(65) Prior Publication Data

US 2021/0097974 A1   Apr. 1, 2021

(30) Foreign Application Priority Data

Sep. 27, 2019   (CN) .......................... 201910927040.3

(51) Int. Cl.
*G10L 13/047* (2013.01)
*G06N 3/08* (2006.01)
(Continued)

(52) U.S. Cl.
CPC ............. *G10L 13/047* (2013.01); *G06N 3/08* (2013.01); *G10L 13/06* (2013.01); *G10L 13/08* (2013.01)

(58) Field of Classification Search
CPC ..... G10L 13/00; G10L 2013/00; G10L 13/02; G10L 13/047; G10L 13/06; G10L 13/08;
(Continued)

(56) References Cited

U.S. PATENT DOCUMENTS

2012/0253812 A1   10/2012   Kalinli et al.

FOREIGN PATENT DOCUMENTS

CN   105118498 A   12/2015
CN   107945786 A   4/2018
(Continued)

OTHER PUBLICATIONS

C. Lin, R. Wu, J. Chang and S. Liang, "A novel prosodic-information synthesizer based on recurrent fuzzy neural network for the Chinese TTS system," in IEEE Transactions on Systems, Man, and Cybernetics, Part B (Cybernetics), vol. 34, No. 1, pp. 309-324, Feb. 2004, doi: 10.11 (Year: 2004).*

(Continued)

*Primary Examiner* — Angela A Armstrong
(74) *Attorney, Agent, or Firm* — Lathrop GPM LLP

(57) ABSTRACT

The present application discloses a training method and an apparatus for a speech synthesis model, electronic device, and storage medium. The method includes: taking a syllable input sequence, a phoneme input sequence and a Chinese character input sequence of a current sample as inputs of an encoder of a model to be trained, to obtain encoded representations of these three sequences at an output end of the encoder; fusing the encoded representations of these three sequences, to obtain a weighted combination of these three sequences; taking the weighted combination as an input of an attention module, to obtain a weighted average of the weighted combination at each moment at an output end of the attention module; taking the weighted average as an input of a decoder of the model to be trained, to obtain a speech Mel spectrum of the current sample at an output end of the decoder.

12 Claims, 4 Drawing Sheets

(51) Int. Cl.
*G10L 13/06* (2013.01)
*G10L 13/08* (2013.01)

(58) Field of Classification Search
CPC ........ G10L 25/30; G06N 3/00; G06N 3/0445; G06N 3/0454; G06N 3/08
See application file for complete search history.

(56) References Cited

FOREIGN PATENT DOCUMENTS

| CN | 108447486 A | * | 8/2018 | ............. G06F 40/58 |
|----|-------------|---|--------|--------------------------|
| CN | 109036377 A |   | 12/2018 | |
| CN | 109065032 A |   | 12/2018 | |
| CN | 109065044 A | * | 12/2018 | ............. G10L 15/02 |

OTHER PUBLICATIONS

M. Dong, Z. Zhang and H. Ming, "Representing raw linguistic information in Chinese text-to-speech system," 2017 Asia-Pacific Signal and Information Processing Association Annual Summit and Conference (APSIPA ASC), 2017, pp. 167-170, doi: 10.1109/APSIPA.2017.8282022. (Year: 2017).*

Yves-Noel Weweler, "Single-Speaker End-To-End Neural Text-To-Speech Synthesis", Oct. 2018, University of Applied Sciences Münster. (Year: 2018).*

S. Banerjee and K. Tsioutsiouliklis, "Relation Extraction Using Multi-Encoder LSTM Network on a Distant Supervised Dataset," 2018 IEEE 12th International Conference on Semantic Computing (ICSC), 2018, pp. 235-238, doi: 10.1109/ICSC.2018.00040. (Year: 2018).*

Li, Bo, and Heiga Zen. "Multi-language multi-speaker acoustic modeling for LSTM-RNN based statistical parametric speech synthesis." (2016). (Year: 2016).*

"Pinyin Chart", East Asia Student, Copyright 2010 (Year: 2010).*

Zhang, Mingyang, et al. "Joint training framework for text-to-speech and voice conversion using multi-source tacotron and wavenet." arXiv preprint arXiv:1903.12389 (2019). (Year: 2019).*

Chinese Patent Application No. 201910927040.3 Office Action dated Jun. 3, 2020, 5 pages.

Chinese Patent Application No. 201910927040.3 English translation of Office Action dated Jun. 3, 2020, 6 pages.

* cited by examiner

TRAINING METHOD AND APPARATUS FOR A SPEECH SYNTHESIS MODEL, AND STORAGE MEDIUM

CROSS REFERENCE TO RELATED APPLICATIONS

This application is based on and claims priority to Chinese patent application Serial No. 201910927040.3 filed on Sep. 27, 2019, the entire contents of which are incorporated herein by reference.

TECHNICAL FIELD

The present application relates to a technical field of artificial intelligence, further to a field of computer intelligent speech, and more particularly, to a training method for a speech synthesis model, a training apparatus for a speech synthesis model, and a storage medium.

BACKGROUND

In the field of speech synthesis, methods based on neural networks such as WaveNet and WaveRNN have greatly improved voice quality and degree of naturalness of a synthesized speech. Such method typically requires a front-end system to extract language features based on text and predict information such as fundamental frequency and duration. An end-to-end modeling Tacotron model proposed by Google eliminates the complex front-end system that requires extensive expert knowledge involved, which instead automatically learns information like prosody and emotion of a speech in a sound bank through a sequence conversion model, and the synthesized speech is particularly outstanding in expressiveness. However, there are many challenges in application of Tacotron model in Chinese, mainly due to the large number of Chinese characters, the thousands of commonly used Chinese characters, the prevalence of homophones, and the differences which exist in the pronunciation of homophones and even in the pronunciation of the same character in different terms or contexts.

At present, the implementations of Tacotron model in Chinese are roughly grouped into three types: (1) similar to the application of Tacotron in English, Chinese characters are directly used as input units; (2) Chinese characters are degraded into syllables which are used as input units; (3) syllables are split into phonemes which are used as input units. With the above scheme (1), the sound bank used for speech synthesis training is usually only with a scale from few hours to tens of hours while there are a large number of Chinese characters, and in the case that Chinese characters are directly used as the input units of model, the pronunciations of many low-frequency Chinese characters cannot be fully learned due to data sparseness; with the above schemes (2) and (3), the problem of sparseness of Chinese characters may be solved using phonemes or syllables as input units, and homophones in Chinese characters are more fully trained by a sharing unit; however, there are obvious differences in the manner of articulation of homophones even though they have the same pronunciation, e.g., the pronunciation of a common functional word is usually weaker, while the pronunciation of a real word is relative clearer. Tacotron model tends to learn how to pronounce functional words, resulting in a poor synthesis effect. In addition, there is another problem by using phonemes as the input units. Some finals (simple or compound vowel of a Chinese syllable) may be used as a complete syllable alone. The final has different pronunciations when used as a complete syllable and not used as a complete syllable. The finals, when used as independent syllables, require a more complete pronunciation process. However, the two cases cannot be recognized by the phoneme-based model, resulting in insufficient pronunciation of the final when used independently.

SUMMARY

Embodiments of the present application provide a training method for a speech synthesis model, a training apparatus for a speech synthesis model, an electronic device, and a storage medium, which may effectively improve a pronunciation effect and provide highly expressive and degree of naturalness Chinese synthetic speech for speech products.

In one aspect, an embodiment of the present application provides a training method for a speech synthesis model, including: taking a syllable input sequence, a phoneme input sequence and a Chinese character input sequence of a current sample as inputs of an encoder of a model to be trained, to obtain encoded representations of the syllable input sequence, the phoneme input sequence and the Chinese character input sequence at an output end of the encoder; fusing the encoded representations of the syllable input sequence, the phoneme input sequence and the Chinese character input sequence, to obtain a weighted combination of the syllable input sequence, the phoneme input sequence and the Chinese character input sequence; taking the weighted combination of the syllable input sequence, the phoneme input sequence and the Chinese character input sequence as an input of an attention module, to obtain a weighted average of the weighted combination of the syllable input sequence, the phoneme input sequence and the Chinese character input sequence at each moment at an output end of the attention module; and taking the weighted average of the weighted combination of the syllable input sequence, the phoneme input sequence and the Chinese character input sequence at each moment as an input of a decoder of the model to be trained, to obtain a speech Mel spectrum of the current sample at an output end of the decoder.

The above embodiment has the following advantages or beneficial effects: this embodiment implements joint training of an encoder and a decoder of the model to be trained by inputting texts at an input end of the model to be trained and outputting speech at an output end of the model to be trained. Because the present application employs the technical means of fusing the syllable input sequence, phoneme input sequence and Chinese character input sequence, it overcomes the technical problem of poor speech synthesis effect in the prior art caused by only using syllable input sequence or phoneme input sequence or Chinese character input sequence, and further achieves the technical effect of effectively improving the pronunciation effect, providing high expressive and degree of naturalness Chinese synthetic speech for a speech product.

In an embodiment, said taking a syllable input sequence, a phoneme input sequence and a Chinese character input sequence of a current sample as inputs of an encoder of a model to be trained, to obtain encoded representations of the syllable input sequence, the phoneme input sequence and the Chinese character input sequence at an output end of the encoder, includes: inputting the syllable input sequence, the phoneme input sequence and the Chinese character input sequence to a shared encoder; and obtaining the encoded representations of the syllable input sequence, the phoneme input sequence and the Chinese character input sequence at an output end of the shared encoder.

The above embodiment has the following advantages or beneficial effects: this embodiment may obtain the encoded representations of the syllable input sequence, the phoneme input sequence and the Chinese character input sequence at an output end of a shared encoder, by inputting the syllable input sequence, the phoneme input sequence and the Chinese character input sequence to the shared encoder.

In an embodiment, said taking a syllable input sequence, a phoneme input sequence and a Chinese character input sequence of a current sample as inputs of an encoder of a model to be trained, to obtain encoded representations of the syllable input sequence, the phoneme input sequence and the Chinese character input sequence at an output end of the encoder, includes: inputting the syllable input sequence, the phoneme input sequence and the Chinese character input sequence to three independent convolution layer transformation modules, respectively, and obtaining a convolutional-transformed syllable input sequence, a convolutional-transformed phoneme input sequence and a convolutional-transformed Chinese character input sequence at output ends of the three independent convolution layer transformation modules, respectively; taking the convolutional-transformed syllable input sequence, the convolutional-transformed phoneme input sequence and the convolutional-transformed Chinese character input sequence as inputs of a sequence transformation neural network module, to obtain the encoded representations of the syllable input sequence, the phoneme input sequence and the Chinese character input sequence at an output end of the sequence transformation neural network module.

The above embodiment has the following advantages or beneficial effects: this embodiment may obtain the encoded representations of the syllable input sequence, the phoneme input sequence and the Chinese character input sequence at an output end of a sequence transformation neural network module, by inputting the syllable input sequence, the phoneme input sequence and the Chinese character input sequence to the three independent convolution layer transformation modules, respectively and taking the convolutional-transformed syllable input sequence, phoneme input sequence and Chinese character input sequence as inputs of the sequence transformation neural network module.

In an embodiment, said taking a syllable input sequence, a phoneme input sequence and a Chinese character input sequence of a current sample as inputs of an encoder a the model to be trained, to obtain encoded representations of the syllable input sequence, the phoneme input sequence and the Chinese character input sequence at an output end of the encoder, includes: inputting the syllable input sequence, the phoneme input sequence and the Chinese character input sequence to three independent encoders, respectively; and obtaining the encoded representations of the syllable input sequence, the phoneme input sequence and the Chinese character input sequence at output ends of the three independent encoders, respectively.

The above embodiment has the following advantages or beneficial effects: this embodiment may obtain the encoded representations of the syllable input sequence, the phoneme input sequence and the Chinese character input sequence at the output ends of the independent encoders, by inputting the syllable input sequence, the phoneme input sequence and the Chinese character input sequence to the three independent encoders, respectively. According to experiments, it has been found that three solutions where the phoneme, syllable, and Chinese character are respectively fused with an independent final of the phoneme may solve the problem of end-to-end Chinese speech synthesis to a certain extent, and the independent encoder has the best effect. Hearing test results show that the occurrence of pronunciation problems is decreased from 2% to 0.4%.

In an embodiment, prior to said taking a syllable input sequence, a phoneme input sequence and a Chinese character input sequence of a current sample as inputs of an encoder of a model to be trained, the method further includes: converting phonemes, syllables and Chinese characters in the current sample into respective vector representations of a fixed dimension, respectively; converting vector representations of the syllables and the Chinese characters into vector representations having the same length as the vector representation of the phonemes, to obtain the syllable input sequence, the phoneme input sequence and the Chinese character input sequence, and performing the step of taking the syllable input sequence, the phoneme input sequence and the Chinese character input sequence as inputs of the encoder of the model to be trained.

The above embodiment has the following advantages or beneficial effects: this embodiment may obtain the syllable input sequence, the phoneme input sequence and the Chinese character input sequence by converting vector representations of the syllables and the Chinese characters into vector representations having the same length as the vector representation of phonemes, and then the step of taking the syllable input sequence, the phoneme input sequence and the Chinese character input sequence as inputs of the encoder of the model to be trained can be performed.

In an embodiment, the phoneme input sequence includes: a tone input sequence, a rhotic accent input sequence, a punctuation input sequence and input sequences of 35 independent finals; the phoneme input sequence includes 106 phoneme units; each phoneme unit includes 106 bits, a value of a significant bit in 106 bits is 1 and a value of a non-significant bit is 0; the Chinese character input sequence includes: input sequences of 3000 Chinese characters; the syllable input sequence includes: input sequences of 508 syllables.

The above embodiment has the following advantages or beneficial effects: this embodiment extracts effective information from syllables and Chinese characters, respectively to improve the pronunciation effect, especially in the case of homophones, significantly reducing the pronunciation problems. The present application may provide high expressive and degree of naturalness Chinese synthetic speech for a product, which may effectively improve the user-machine interaction experience, increase users' stickiness, and facilitate the promotion of Baidu APP, smart speakers and map navigation systems.

In another aspect, the present application also provides a training apparatus for a speech synthesis model, the apparatus includes: an input module, a fusion module, and an output module.

The input module is configured for taking a syllable input sequence, a phoneme input sequence and a Chinese character input sequence of a current sample as inputs of an encoder of a model to be trained, to obtain encoded representations of the syllable input sequence, the phoneme input sequence and the Chinese character input sequence at an output end of the encoder.

The fusion module is configured for fusing the encoded representations of the syllable input sequence, the phoneme input sequence and the Chinese character input sequence, to obtain a weighted combination of the syllable input sequence, the phoneme input sequence and the Chinese character input sequence; and taking the weighted combination of the syllable input sequence, the phoneme input sequence and the Chinese character input sequence as inputs of an attention module, to obtain a weighted average of the weighted combination of the syllable input sequence, the phoneme input sequence and the Chinese character input sequence at each moment at an output end of the attention module.

The output module is configured for taking the weighted average of the weighted combination of the syllable input sequence, the phoneme input sequence and the Chinese character input sequence at each moment as an input of a decoder of the model to be trained, to obtain a speech Mel spectrum of the current sample at an output end of the decoder.

In an embodiment, the input module is configured for inputting the syllable input sequence, the phoneme input sequence and the Chinese character input sequence to a shared encoder; and obtaining the encoded representations of the syllable input sequence, the phoneme input sequence and the Chinese character input sequence at an output end of the shared encoder.

In an embodiment, the input module is configured for inputting the syllable input sequence, the phoneme input sequence and the Chinese character input sequence to three independent convolution layer transformation modules, respectively and obtaining a convolutional-transformed syllable input sequence, a convolutional-transformed phoneme input sequence and a convolutional-transformed Chinese character input sequence at output ends of the three independent convolution layer transformation modules, respectively; taking the convolutional-transformed syllable input sequence, the convolutional-transformed phoneme input sequence and the convolutional-transformed Chinese character input sequence as inputs of a sequence transformation neural network module, to obtain the encoded representations of the syllable input sequence, the phoneme input sequence and the Chinese character input sequence at an output end of the sequence transformation neural network module.

In an embodiment, the input module is configured for inputting the syllable input sequence, the phoneme input sequence and the Chinese character input sequence to three independent encoders, respectively; and obtaining the encoded representations of the syllable input sequence, the phoneme input sequence and the Chinese character input sequence at output ends of each independent encoders, respectively.

In an embodiment, the apparatus further includes: a conversion module, configured for converting phonemes, syllables and Chinese characters in the current sample into respective vector representations of a fixed dimension, respectively; and converting vector representations of the syllables and the Chinese characters into vector representations having the same length as the vector representation of the phonemes, to obtain the syllable input sequence, the phoneme input sequence and the Chinese character input sequence.

The input module is configured for performing the step of taking the syllable input sequence, the phoneme input sequence and the Chinese character input sequence as inputs of the encoder of the model to be trained.

In embodiment, the phoneme input sequence includes: a tone input sequence, a rhotic accent input sequence, a punctuation input sequence and input sequences of 35 independent finals; the phoneme input sequence includes 106 phoneme units; each phoneme unit includes 106 bits, a value of a significant bit in 106 bits is 1 and a value of a non-significant bit is 0; the Chinese characters input sequence includes: input sequences of 3000 Chinese characters; the syllable input sequence includes: input sequences of 508 syllables.

In another aspect, an embodiment of the present application provides an electronic device, including: one or more processors; and a memory stored for one or more programs. When the one or more programs are executed by the one or more processors, the one or more processors implement the training method for a speech synthesis model according to any embodiment of the present application.

In another aspect, an embodiment of the present application provides a storage medium on having a computer program stored thereon. When the program is executed by a processor, the training method for a speech synthesis model according to any embodiment of the present application is implemented.

One embodiment in the above application has the following advantages or beneficial effects: with the training method for a speech synthesis model, the training apparatus for a speech synthesis model, the electronic device, and the storage medium proposed in the present application, a syllable input sequence, a phoneme input sequence and a Chinese character input sequence of a current sample are taken as inputs of an encoder of a model to be trained, to obtain encoded representations of the syllable input sequence, the phoneme input sequence and the Chinese character input sequence at an output end of the encoder; the encoded representations of the syllable input sequence, the phoneme input sequence and the Chinese character input sequence are fused, to obtain a weighted combination of the syllable input sequence, the phoneme input sequence and the Chinese character input sequence; the weighted combination of the syllable input sequence, the phoneme input sequence and the Chinese character input sequence are taken as inputs of an attention module, to obtain a weighted average of the weighted combination of the syllable input sequence, the phoneme input sequence and the Chinese character input sequence at each moment at an output end of the attention module; the weighted average of the weighted combination of the syllable input sequence, the phoneme input sequence and the Chinese character input sequence at each moment is taken as an input of a decoder of the model to be trained, to obtain a speech Mel spectrum of the current sample at an output end of the decoder. That is, the present application implements joint training of an encoder and a decoder of the model to be trained by inputting texts at an input end of the model to be trained and outputting speech at an output end of the model to be trained. Because the present application employs the technical means of fusing the syllable input sequence, phoneme input sequence and Chinese character input sequence, it overcomes the technical problem of poor speech synthesis effect in the prior art caused by only using syllable input sequence or phoneme input sequence or Chinese character input sequence, and further achieves the technical effect of effectively improving the pronunciation effect, providing high expressive and degree of naturalness Chinese synthetic speech for a speech product; and the technical solutions of embodiments of the present application are simple, convenient, easy to popularize, and have a more wide range of application.

Other effects provided by the above-mentioned optional manners will be described below in conjunction with specific embodiments.

BRIEF DESCRIPTION OF THE DRAWINGS

The drawings are used to better understand the present solution, and do not constitute limitations on the present application, in which.

DETAILED DESCRIPTION

Exemplary embodiments of the present application are described below in conjunction with the accompanying drawings, which include various details of embodiments of the present application to facilitate understanding, and they should be considered as merely exemplary. Therefore, it should be considered for those skilled in the art that various changes and modifications may be made to the embodiments described herein without departing from the scope and spirit of the present application. Also, descriptions of well-known functions and structures are omitted in the following description for clarity and conciseness.

Example One

Figure 1:
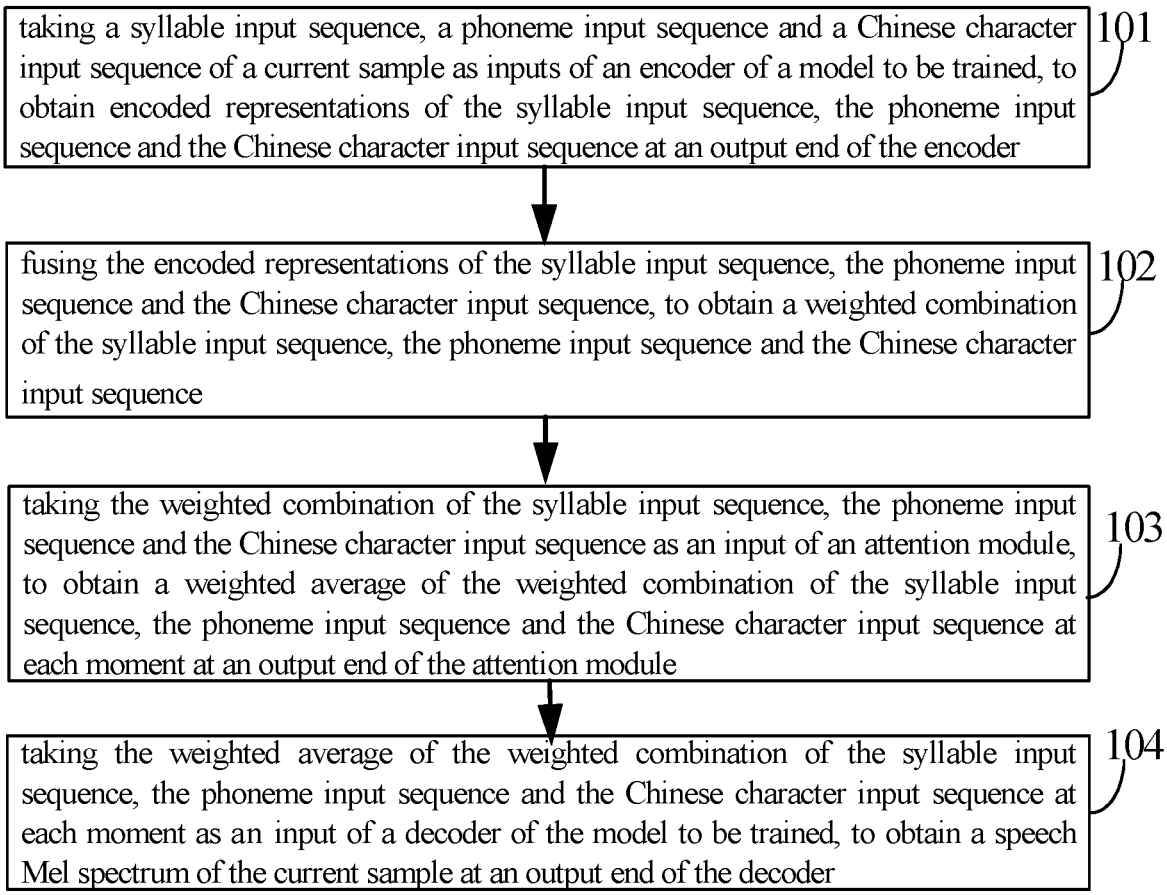
FIG. 1 is a schematic flowchart of a training method for a speech synthesis model provided in Embodiment One of the present application.

FIG. 1 is a schematic flowchart of a training method for a speech synthesis model provided in Embodiment One of the present application. The method may be performed by a training apparatus for the speech synthesis model or an electronic device, which may be implemented in software and/or hardware and may be integrated in any smart device with a network communication functionality. As shown in FIG. 1, the training method for the speech synthesis model may include the following steps.

S101: a syllable input sequence, a phoneme input sequence and a Chinese character input sequence of a current sample are taken as inputs of an encoder of a model to be trained, to obtain encoded representations of the syllable input sequence, the phoneme input sequence and the Chinese character input sequence at an output end of the encoder.

In a specific embodiment of the present application, the electronic device may take the syllable input sequence, the phoneme input sequence and the Chinese character input sequence of the current sample as inputs of the encoder of the model to be trained, to obtain the encoded representations of the syllable input sequence, the phoneme input sequence and the Chinese character input sequence at the output end of the encoder. Specifically, the electronic device may input the syllable input sequence, the phoneme input sequence and the Chinese character input sequence to a shared encoder; and obtain the encoded representations of the syllable input sequence, the phoneme input sequence and the Chinese character input sequence at an output end of the shared encoder. Preferably, the electronic device may also input the syllable input sequence, the phoneme input sequence and the Chinese character input sequence to three independent convolution layer transformation modules, respectively, and obtain a convolutional-transformed syllable input sequence, a convolutional-transformed phoneme input sequence and a convolutional-transformed Chinese character input sequence at output ends of the three independent convolution layer transformation modules, respectively; and take the convolutional-transformed syllable input sequence, the convolutional-transformed phoneme input sequence and the convolutional-transformed Chinese character input sequence as inputs of a sequence transformation neural network module, to obtain the encoded representations of the syllable input sequence, the phoneme input sequence and the Chinese character input sequence at an output end of the sequence transformation neural network module. The sequence transformation neural network herein includes but is not limited to: RNN, LSTM, GRU, Transformer. Preferably, the electronic device may also input the syllable input sequence, the phoneme input sequence and the Chinese character input sequence to three independent encoders, respectively; and obtain the encoded representations of the syllable input sequence, the phoneme input sequence and the Chinese character input sequence at output ends of the three independent encoders.

S102: the encoded representations of the syllable input sequence, the phoneme input sequence and the Chinese character input sequence are fused, to obtain a weighted combination of the syllable input sequence, the phoneme input sequence and the Chinese character input sequence.

In a specific embodiment of the present application, the electronic device may fuse the encoded representations of the syllable input sequence, the phoneme input sequence and the Chinese character input sequence, to obtain the weighted combination of the syllable input sequence, the phoneme input sequence and the Chinese character input sequence. For example, the electronic device may perform a linear superposition on the encoded representations of the syllable input sequence, the phoneme input sequence and the Chinese character input sequence, to obtain the weighted combination of the syllable input sequence, the phoneme input sequence and the Chinese character input sequence.

S103: the weighted combination of the syllable input sequence, the phoneme input sequence and the Chinese character input sequence is taken as an input of an attention module, to obtain a weighted average of the weighted combination of the syllable input sequence, the phoneme input sequence and the Chinese character input sequence at each moment at an output end of the attention module.

In a specific embodiment of the present application, the electronic device may take the weighted combination of the syllable input sequence, the phoneme input sequence and the Chinese character input sequence as the input of the attention module, to obtain the weighted average of the weighted combination of the syllable input sequence, the phoneme input sequence and the Chinese character input sequence at each moment at the output end of the attention module. For example, during a predetermined time period, such as during a processing of the training method, the weighted average can be obtained at each moment at the output end of the attention module. The weighted average is obtained through multiplying each value by a corresponding weight, summing them up to get a total value, then dividing the total value by a total number of the values. The value of the weighted average depends not only on a proportion of each value (variable value) in the total value, but also on how many times (frequency number) each value appears.

S104: the weighted average of the weighted combination of the syllable input sequence, the phoneme input sequence and the Chinese character input sequence at each moment is taken as an input of a decoder of the model to be trained, to obtain a speech Mel spectrum of the current sample at an output end of the decoder.

In a specific embodiment of the present application, the electronic device may obtain the speech Mel spectrum of the current sample at the output end of the decoder by taking the weighted average of the weighted combination of the syllable input sequence, the phoneme input sequence and the Chinese character input sequence at each moment as the input of the decoder of the model to be trained.

In a specific embodiment of the present application, the Tacotron model is based on a typical encoder-decoder structure. The encoder obtains the encoded representation of each input unit based on an input unit sequence (for English, usually containing letters and punctuations, etc.) through the convolutional transformation of and transformation of the sequence transformation neural network; the decoder takes the output Mel spectrum of a previous frame as an input, uses a weighted combination representation of the encoder output obtained by the attention mechanism, and then generates two outputs through LSTM transformation or the like. One of the two outputs is the Mel spectrum of the current frame and the other is a stop probability to determine whether to terminate. When the stop probability is greater than 50%, the synthesis ends, otherwise the current output is used as an input for the next frame and this autoregressive process proceeds. In this model, the encoder is responsible for encoding each input unit and the decoder determines a currently synthesized speech based on the encoding, while a memory function of LSTM is utilized to generate them orderly. This model is a typical one-to-many mapping model, and the same content may correspond to speeches of different rhythms and different emotions. When different speeches (outputs) in a training set correspond to the same text (input), the pronunciation finally learned by the model reflects a statistical average effect. This application aims to reduce this one-to-many mapping relationship, so that the model may learn to synthesize with appropriate pronunciations in different contexts. Considering that the phoneme sequence has the best coverage without occurrence of out-of-set pronunciation units, 106 phoneme units may be selected as basic units of the model input, and each unit may get enough data to be fully trained; the input is in a form of one-hot and transformed into a dense vector representation of a fixed dimension via an embedding layer. A feature such as tone, rhotic accent and punctuation is also transformed into a vector of the same dimension via the embedding layer, and then added to the phoneme vector and sent into the neural network. In order to better learn pronunciation characteristics when the finals are independent, in this application, 35 independent finals in the phoneme are modeled separately, the independent final and the final that appears behind an initial are considered as two different units. According to experiments, it has been found that this modeling strategy solves the problem of unclear pronunciation of the independent final very well; furthermore, in order to distinguish pronunciation characteristics of homophones, in this application, syllables and Chinese characters are used as auxiliary information to be entered the network to assist the model in distinguishing pronunciation characteristics of different Chinese characters. The number of syllables without tones is 508, and 3000 high-frequency Chinese characters in the training set and 508 syllables are selected for a total of 3508 units. If a Chinese character does not belong to the 3000 high-frequency Chinese characters, it degenerates into a corresponding syllable unit, which ensures a high coverage.

The training method for a speech synthesis model proposed in the embodiments of the present application takes a syllable input sequence, a phoneme input sequence and a Chinese character input sequence of a current sample as inputs of an encoder of the model to be trained, to obtain encoded representations of the syllable input sequence, the phoneme input sequence and the Chinese character input sequence at an output end of the encoder; fuses the encoded representations of the syllable input sequence, the phoneme input sequence and the Chinese character input sequence, to obtain a weighted combination of the syllable input sequence, the phoneme input sequence and the Chinese character input sequence; takes the weighted combination of the syllable input sequence, the phoneme input sequence and the Chinese character input sequence as an input of an attention module, to obtain a weighted average of the weighted combination of the syllable input sequence, the phoneme input sequence and the Chinese character input sequence at each moment at an output end of the attention module; takes the weighted average of the weighted combination of the syllable input sequence, the phoneme input sequence and the Chinese character input sequence at each moment as an input of a decoder of the model to be trained, to obtain a speech Mel spectrum of the current sample at an output end of the decoder. That is, the present application implements joint training of the encoder and the decoder of the model to be trained by inputting texts at the input end of the model to be trained and outputting speech at the output end of the model to be trained. Because the present application employs the technical means of fusing the syllable input sequences, phoneme input sequences and Chinese character input sequences, it overcomes the technical problem of poor speech synthesis effect in the prior art caused by only using syllable input sequences or phoneme input sequences or Chinese character input sequences, and further achieves the technical effect of effectively improving the pronunciation effect, providing high expressive and degree of naturalness Chinese synthetic speech for a speech product. The technical solutions of embodiments of the present application are simple, convenient, easy to popularize, and have a more wide range of application.

Example Two

Figure 2:
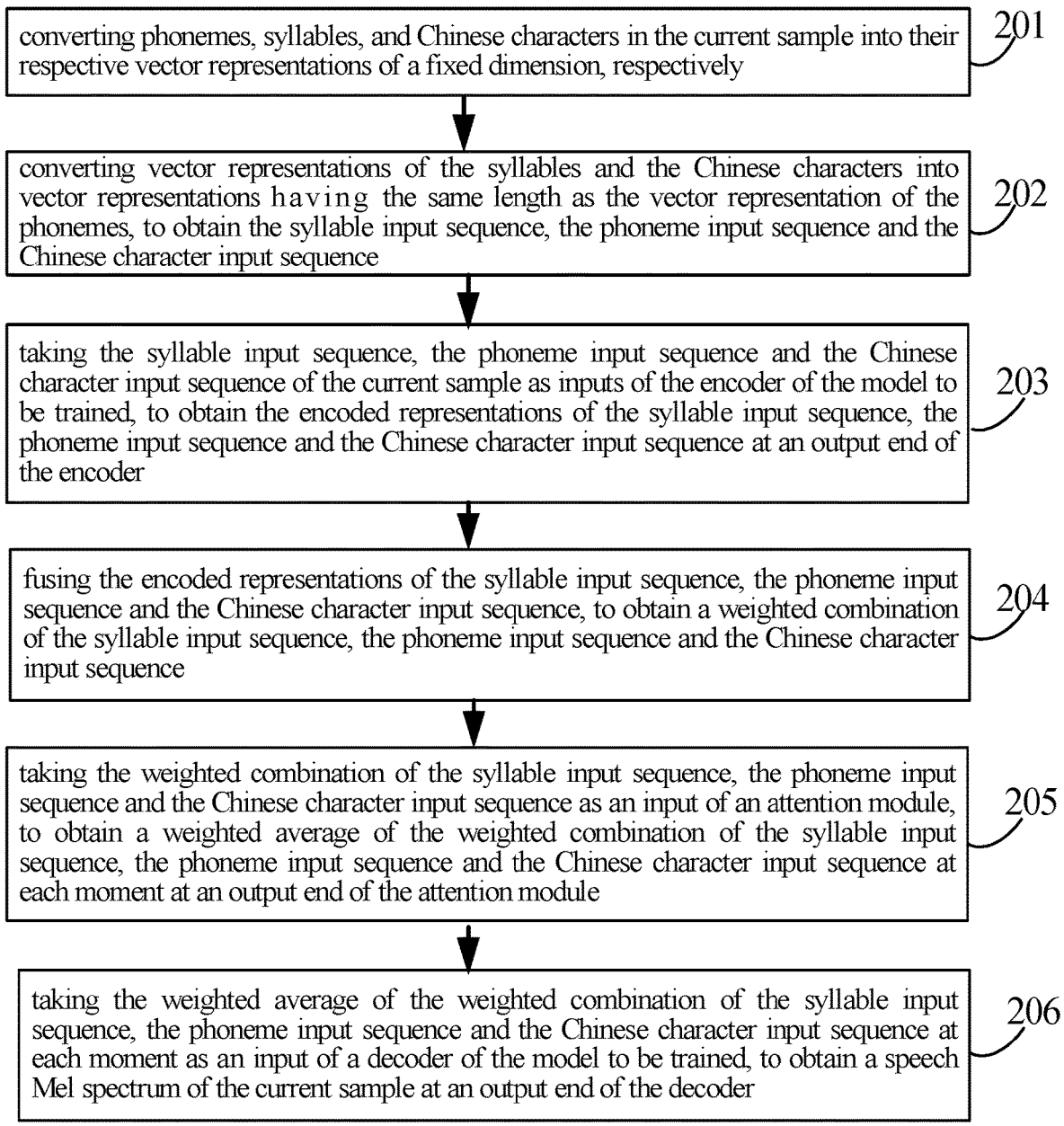
FIG. 2 is a schematic flowchart of a training method for a speech synthesis model provided in Embodiment Two of the present application.

FIG. 2 is a schematic flowchart of a training method for a speech synthesis model provided in Embodiment two of the present application. As shown in FIG. 2, the training method for the speech synthesis model may include the following steps.

S201: phonemes, syllables, and Chinese characters in the current sample are converted into respective vector representations of a fixed dimension, respectively.

In a specific embodiment of the present application, the electronic device may convert phonemes, syllables, and Chinese characters in the current sample into respective vector representations of a fixed dimension, respectively. Specifically, the electronic device may convert the phonemes in the current sample into a vector representation of a first length; convert the syllables and the Chinese characters in the current sample into vector representations of a second length. The first length is greater than the second length.

S202: vector representations of the syllables and the Chinese characters are converted into vector representations having the same length as the vector representation of the phonemes, to obtain the syllable input sequence, the phoneme input sequence and the Chinese character input sequence.

In a specific embodiment of the present application, the electronic device may convert vector representations of the syllables and the Chinese characters into vector representations having the same length as the vector representation of the phonemes, to obtain the syllable input sequence, the phoneme input sequence and the Chinese character input sequence. Specifically, the electronic device may use the vector representation of phonemes that has the first length as the phoneme input sequence; convert vector representations of the syllables and the Chinese characters that have the second length to vector representations having the first length, and take the converted vector representations of the syllables and Chinese characters as the syllable input sequence and Chinese character input sequence, respectively.

S203: the syllable input sequence, the phoneme input sequence and the Chinese character input sequence of the current sample are taken as inputs of the encoder of the model to be trained, to obtain the encoded representations of the syllable input sequence, the phoneme input sequence and the Chinese character input sequence at an output end of the encoder.

In a specific embodiment of the present application, the electronic device may take the syllable input sequence, the phoneme input sequence and the Chinese character input sequence of the current sample as inputs of the encoder of the model to be trained, to obtain the encoded representations of the syllable input sequence, the phoneme input sequence and the Chinese character input sequence at the output end of the encoder. Specifically, the electronic device may input the syllable input sequence, the phoneme input sequence and the Chinese character input sequence to a shared encoder; and obtain encoded representations of the syllable input sequence, the phoneme input sequence and the Chinese character input sequence at an output end of the shared encoder. Preferably, the electronic device may also input the syllable input sequence, the phoneme input sequence and the Chinese character input sequence to three independent convolution layer transformation modules, respectively, and obtain a convolutional-transformed syllable input sequence, a convolutional-transformed phoneme input sequence and a convolutional-transformed Chinese character input sequence at output ends of the three independent convolution layer transformation modules, respectively; and take the convolutional-transformed syllable input sequence, the convolutional-transformed phoneme input sequence and the convolutional-transformed Chinese character input sequence as inputs of a sequence transformation neural network module, to obtain encoded representations of the syllable input sequence, the phoneme input sequence and the Chinese character input sequence at an output end of the sequence transformation neural network module. The sequence transformation neural network herein includes but is not limited to: RNN, LSTM, GRU, Transformer. Preferably, the electronic device may also input the syllable input sequence, the phoneme input sequence and the Chinese character input sequence to three independent encoders, respectively; and obtain the encoded representations of the syllable input sequence, the phoneme input sequence and the Chinese character input sequence at the output ends of the three independent encoders, respectively.

S204: the encoded representations of the syllable input sequence, the phoneme input sequence and the Chinese character input sequence are fused, to obtain a weighted combination of the syllable input sequence, the phoneme input sequence and the Chinese character input sequence.

In a specific embodiment of the present application, the electronic device may fuse the encoded representations of the syllable input sequence, the phoneme input sequence and the Chinese character input sequence, to obtain a weighted combination of the syllable input sequence, the phoneme input sequence and the Chinese character input sequence. For example, the electronic device may perform a linear superposition on the encoded representations of the syllable input sequence, the phoneme input sequence and the Chinese character input sequence, to obtain the weighted combination of the syllable input sequence, the phoneme input sequence and the Chinese character input sequence.

S205: the weighted combination of the syllable input sequence, the phoneme input sequence and the Chinese character input sequence is taken as an input of an attention module, to obtain a weighted average of the weighted combination of the syllable input sequence, the phoneme input sequence and the Chinese character input sequence at each moment at an output end of the attention module.

In a specific embodiment of the present application, the electronic device may take the weighted combination of the syllable input sequence, the phoneme input sequence and the Chinese character input sequence as the input of an attention module, to obtain the weighted average of the weighted combination of the syllable input sequence, the phoneme input sequence and the Chinese character input sequence at each moment at the output end of the attention module. For example, the attention module outputs the weighted average at its output end at each moment within a predetermined time period or in a processing of the training.

S206: the weighted average of the weighted combination of the syllable input sequence, the phoneme input sequence and the Chinese character input sequence at each moment is taken as an input of a decoder of the model to be trained, to obtain a speech Mel spectrum output of the current sample at an output end of the decoder.

Figure 3:
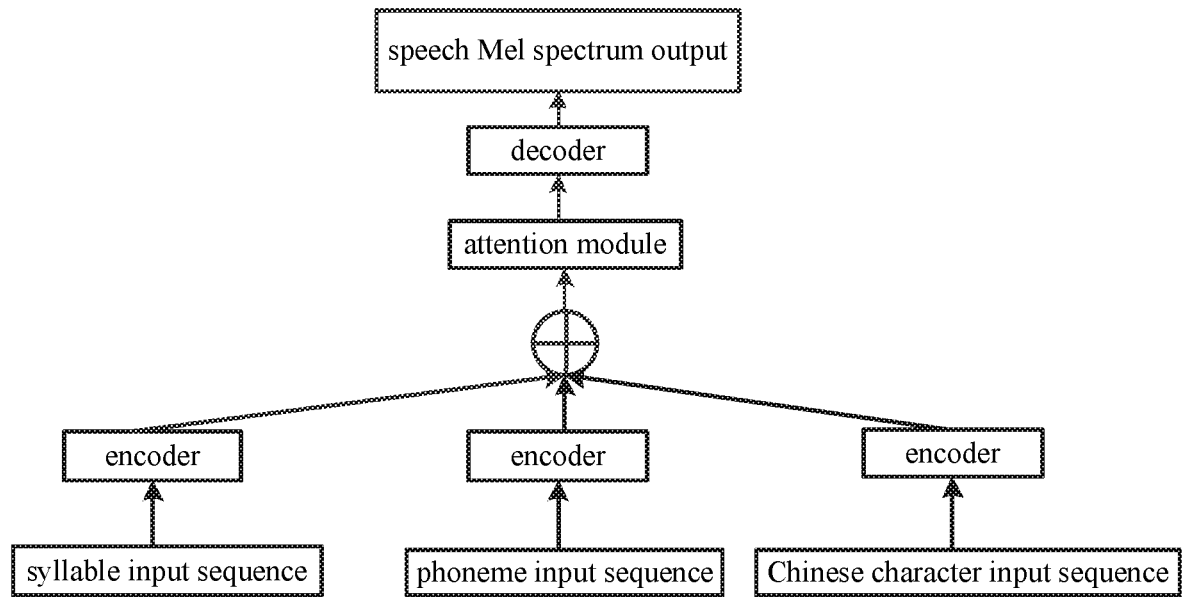
FIG. 3 is a schematic structural diagram of a Tacotron model provided in Embodiment Two of the present application.

FIG. 3 is a schematic structural diagram of a Tacotron model provided in Embodiment Two of the present application. As shown in FIG. 3, the Tacotron model is based on a typical encoder-decoder structure. By taking a syllable input sequence, a phoneme input sequence and a Chinese character input sequence of a current sample as inputs of an encoder of the model to be trained, encoded representations of the syllable input sequence, the phoneme input sequence and the Chinese character input sequence are obtained at an output end of the encoder. By fusing the encoded representations of the syllable input sequence, the phoneme input sequence and the Chinese character input sequence, a weighted combination of the syllable input sequence, the phoneme input sequence and the Chinese character input sequence is obtained. By taking the weighted combination of the syllable input sequence, the phoneme input sequence and the Chinese character input sequence as an input of an attention module, a weighted average of the weighted combination of the syllable input sequence, the phoneme input sequence and the Chinese character input sequence at each moment is obtained at an output end of the attention module. By taking the weighted average of the weighted combination of the syllable input sequence, the phoneme input sequence and the Chinese character input sequence at each moment as an input of a decoder of the model to be trained, a speech Mel spectrum of the current sample is obtained at an output end of the decoder.

In a specific embodiment of the present application, the phoneme input sequence may include: a tone input sequence, a rhotic accent input sequence, a punctuation input sequence and an input sequence of 35 independent finals; the phoneme input sequence includes 106 phoneme units; each phoneme unit includes 106 bits. The value of a significant bit in 106 bits is 1 and the value of a non-significant bit is 0; the Chinese character input sequence includes: an input sequence of 3000 Chinese characters; the syllable input sequence includes: an input sequence of 508 syllables.

According to experiments, it has been found that three solutions where the phoneme, syllable, and Chinese character are respectively fused with an independent final of phoneme may solve the problem of end-to-end Chinese speech synthesis to a certain extent, and the independent encoder has the best effect. Hearing test results show that the occurrence of pronunciation problems is decreased from 2% to 0.4%. The detailed analysis results show that phoneme substantially determines the type of pronunciation, but in some cases, a change in the syllable will have a certain effect on the pronunciation, while a change in the Chinese character will only affect the manner of articulation. These results prove that the model extracts effective information from syllables and Chinese characters, respectively to improve the pronunciation effect, especially in the case of homophones, significantly reducing the pronunciation problem. The present application may provide high expressive and degree of naturalness Chinese synthetic speech for a product, which may effectively improve the user-machine interaction experience, increase users' stickiness, and facilitate the promotion of Baidu APP, smart speakers and map navigation systems.

The training method for a speech synthesis model proposed in the embodiments of the present application takes a syllable input sequence, a phoneme input sequence and a Chinese character input sequence of a current sample as inputs of an encoder of the model to be trained, to obtain encoded representations of the syllable input sequence, the phoneme input sequence and the Chinese character input at an output end of the encoder; fuses the encoded representations of the syllable input sequence, the phoneme input sequence and the Chinese character input sequence, to obtain a weighted combination of the syllable input sequence, the phoneme input sequence and the Chinese character input sequence; takes the weighted combination of the syllable input sequence, the phoneme input sequence and the Chinese character input sequence as an input of an attention module, to obtain a weighted average of the weighted combination of the syllable input sequence, the phoneme input sequence and the Chinese character input sequence at each moment at an output end of the attention module; takes the weighted average of the weighted combination of the syllable input sequence, the phoneme input sequence and the Chinese character input sequence at each moment as an input of a decoder of the model to be trained, to obtain a speech Mel spectrum of the current sample at an output end of the decoder. That is, the present application implements joint training of the encoder and the decoder of the model to be trained by inputting texts at the input end of the model to be trained and outputting speech at the output end of the model to be trained. Because the present application employs the technical means of fusing the syllable input sequences, phoneme input sequences and Chinese character input sequences, it overcomes the technical problem of poor speech synthesis effect in the prior art caused by only using syllable input sequences or phoneme input sequences or Chinese character input sequences, and further achieves the technical effect of effectively improving the pronunciation effect, providing high expressive and degree of naturalness Chinese synthetic speech for a speech product. The technical solutions of embodiments of the present application are simple, convenient, easy to popularize, and have a more wide range of application.

Example 3

Figure 4:
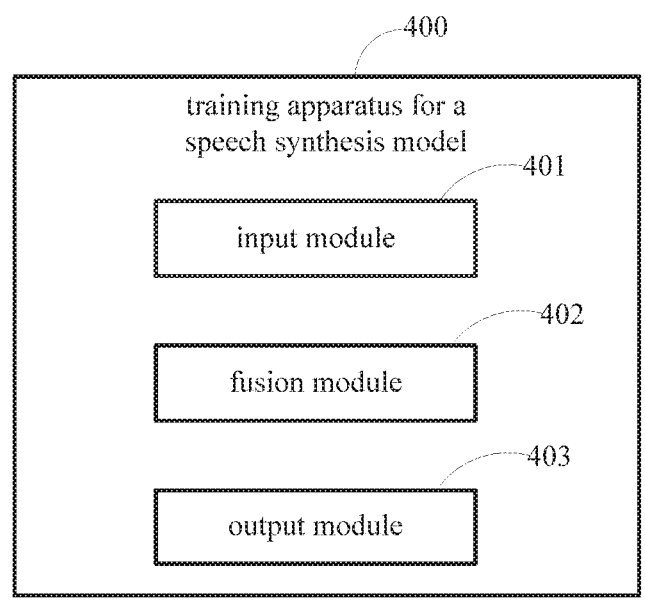
FIG. 4 is a schematic block diagram of a training apparatus for a speech synthesis model provided in Embodiment Three of the present application.

FIG. 4 is a schematic block diagram of a training apparatus for a speech synthesis model provided in Embodiment Three of the present application. As shown in FIG. 4, the apparatus 400 includes: an input module 401, a fusion module 402, and an output module 403.

The input module 401 is configured for taking a syllable input sequence, a phoneme input sequence and a Chinese character input sequence of a current sample as inputs of an encoder of a model to be trained, to obtain encoded representations of the syllable input sequence, the phoneme input sequence and the Chinese character input sequence at an output end of the encoder.

The fusion module 402 is configured for fusing the encoded representations of the syllable input sequence, the phoneme input sequence and the Chinese character input sequence, to obtain a weighted combination of the syllable input sequence, the phoneme input sequence and the Chinese character input sequence; and taking the weighted combination of the syllable input sequence, the phoneme input sequence and the Chinese character input sequence as an input of an attention module, to obtain a weighted average of the weighted combination of the syllable input sequence, the phoneme input sequence and the Chinese character input sequence at each moment at an output end of the attention module.

The output module 403 is configured for taking the weighted average of the weighted combination of the syllable input sequence, the phoneme input sequence and the Chinese character input sequence at each moment as an input of a decoder of the model to be trained, to obtain a speech Mel spectrum of the current sample at an output end of the decoder.

Further, the input module 401 is configured for inputting the syllable input sequence, the phoneme input sequence and the Chinese character input sequence into a shared encoder; and obtaining the encoded representations of the syllable input sequence, the phoneme input sequence and the Chinese character input sequence at an output end of the shared encoder.

Further, the input module 401 is configured for inputting the syllable input sequence, the phoneme input sequence and the Chinese character input sequence to three independent convolution layer transformation modules, respectively and obtaining a convolutional-transformed syllable input sequence, a convolutional-transformed phoneme input sequence and a convolutional-transformed Chinese character input sequence at output ends of the three independent convolution layer transformation modules, respectively; taking the convolutional-transformed syllable input sequence, the convolutional-transformed phoneme input sequence and the convolutional-transformed Chinese character input sequence as inputs of a sequence transformation neural network module, to obtain the encoded representations of the syllable input sequence, the phoneme input sequence and the Chinese character input sequence at an output end of the sequence transformation neural network module.

Further, the input module 401 is configured for inputting the syllable input sequence, the phoneme input sequence and the Chinese character input sequence to three independent encoders, respectively; and obtaining the encoded representations of the syllable input sequence, the phoneme input sequence and the Chinese character input sequence at output ends of the three independent encoders, respectively.

Further, the apparatus further includes: a conversion module 404 (not shown in the figure), configured for converting phonemes, syllables, and Chinese characters in the current sample into respective vector representations of a fixed dimension, respectively; converting vector representations of the syllables and the Chinese character into vector representations having the same length as the vector representation of the phonemes, to obtain the syllable input sequence, the phoneme input sequence and the Chinese character input sequence.

The input module 401 is configured to perform the step of taking the syllable input sequence, the phoneme input sequence and the Chinese character input sequence as inputs of the encoder of the model to be trained.

Further, the phoneme input sequence includes: a tone input sequence, a rhotic accent input sequence, a punctuation input sequence and an input sequence of 35 independent finals; the phoneme input sequence includes 106 phoneme units; each phoneme unit includes 106 bits. The value of a significant bit in 106 bits is 1 and the value of a non-significant bit is 0; the Chinese character input sequence includes: an input sequence of 3000 Chinese characters; the syllable input sequence includes: an input sequence of 508 syllables.

The above training apparatus for the speech synthesis model may execute the method provided by any embodiment of the present invention with the corresponding functional modules and beneficial effects for executing the method. For the technical details which are not described in detail in this embodiment, it refers to the training method for the speech synthesis model provided by any embodiment of the present invention.

Example 4

According to an embodiment of the present application, the present application further provides an electronic device and a readable storage medium.

Figure 5:
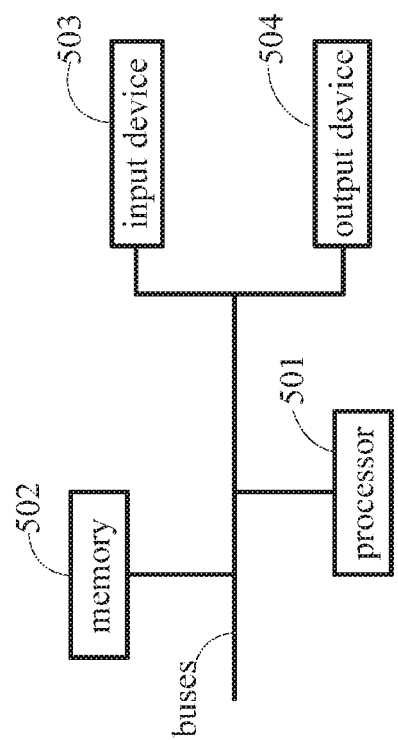
FIG. 5 is a block diagram of an electronic device used for implementing a training method of a speech synthesis model according to an embodiment of the present application.

As shown in FIG. 5, it is a block diagram of an electronic device for a training method for a speech synthesis model according to an embodiment of the present application. Electronic devices are intended to represent various forms of digital computers, such as laptop computers, desktop computers, workbenches, personal digital assistants, servers, blade servers, mainframe computers and other suitable computers. Electronic devices may also represent various forms of mobile apparatus, such as personal digital processing, cellular phones, smart phones, wearable devices and other similar computing apparatus. The components shown herein, their connections and relationships, and their functions are merely as examples, and are not intended to limit the implementations of the application described and/or claimed herein.

As shown in FIG. 5, the electronic device includes: one or more processors 501, a memory 502, and interfaces for connecting various components, including high-speed interfaces and low-speed interfaces. Various components are interconnected with each other using different buses and may be mounted on a common motherboard or otherwise installed as required. The processors may process instructions executed within the electronic device, including instructions stored in or on the memory to display graphical information of GUI on an external input/output apparatus such as a display device coupled to the interfaces. In other embodiments, multiple processors and/or multiple buses may be used together with multiple memories if necessary. Also, multiple electronic devices may be connected, each providing a part of necessary operations (for example, as a server array, a set of blade servers, or a multiprocessor system). A processor 501 is taken as an example in FIG. 5.

The memory 502 is a non-transitory computer-readable storage medium provided by the present application. The memory has instructions stored executable by the at least one processor, so that the at least one processor executes the training method for the speech synthesis model provided in the present application. The non-transitory computer-readable storage medium of the present application stores computer instructions, which are used to cause a computer to execute the training method for the speech synthesis model provided by the present application.

As a non-transitory computer-readable storage medium, the memory 502 may be used to store non-transitory software programs, non-transitory computer executable programs, and modules such as the program instructions/modules (for example, the input module 401, the fusion module 402, and the output module 403 shown in FIG. 4) corresponding to the training method of the speech synthesis model in the embodiment of the present application. The processor 501 executes various functional applications and data processing of the server by running non-transitory software programs, instructions, and modules stored in the memory 502, i.e., the training method for implementing the speech synthesis model in the above method embodiments.

The memory 502 may include a storage program area and a storage data area, where the storage program area may store an operating system and applications required for at least one function; the storage data area may store the created data according to the use of electronic device of the training method for the speech synthesis model, etc. In addition, the memory 502 may include a high-speed random access memory, and may also include a non-transitory memory, e.g., at least one magnetic disk storage device, a flash memory device, or other non-transitory solid-state storage device. In some embodiments, the memory 502 optionally includes memories remotely set with respect to the processor 501, and these remote memories may be connected to an electronic device of a training method for a speech synthesis model through a network. Examples of the above network include, but are not limited to, the Internet, an intranet, a local area network, a mobile communication network, and combinations thereof.

The electronic device of the training method for the speech synthesis model may further include an input device 503 and an output device 504. The processor 501, the memory 502, the input device 503, and the output device 504 may be connected through a bus or otherwise. In FIG. 5, the connection through the bus is taken as an example.

The input device 503 may receive the entered numbers or characters information, and generate key signal inputs related to user settings and functional control of electronic device of the training method for the speech synthesis model, e.g., a touch screen, a keypad, a mouse, a trackpad, a touchpad, a pointing stick, one or more mouse buttons, a trackball, a joystick and other input devices. The output device 504 may include a display device, an auxiliary lighting device (e.g., an LED), a haptic feedback device (e.g., a vibration motor), and the like. The display device may include, but is not limited to, a liquid crystal display (LCD), a light emitting diode (LED) display, and a plasma display. In some embodiments, the display device may be a touch screen.

Various implementations of systems and technologies described herein may be implemented in digital electronic circuitry, integrated circuit systems, application specific ASICs (application specific integrated circuits), computer hardware, firmware, software, and/or combinations thereof. These various embodiments may include: implemented in one or more computer programs, the one or more computer programs being executable and/or interpretable on a programmable system including at least one programmable processor which may be a dedicated or general-purpose programmable processor that may receive data and instructions from a storage system, at least one input device and at least one output device, and transmit the data and instructions to the storage system, the at least one input device and the at least one An output device.

These computing programs (also known as programs, software, software applications, or codes) include machine instructions of programmable processors and may utilize high-level procedural and/or object-oriented programming languages, and/or assembly/machine languages to implement these calculation procedures. As used herein, the terms "machine-readable medium" and "computer-readable medium" refer to any computer program product, device, and/or apparatus (e.g., magnetic disks, optical disks, memories, programmable logic devices (PLDs) for providing machine instructions and/or data to programmable processors, including machine-readable media that receive machine instructions as machine-readable signals. The term "machine-readable signals" refers to any signal for providing machine instructions and/or data to programmable processors.

In order to provide interaction with users, the systems and techniques described herein may be implemented on a computer having a display device (e.g., a CRT (cathode ray tube) or an LCD (liquid crystal display) monitor) for displaying information to users; and a keyboard and pointing device (e.g., a mouse or trackball) through which users may provide inputs to the computer. Other kinds of devices may also be used to provide interaction with users; for example, the feedback provided to users may be any form of sensory feedback (e.g., visual feedback, auditory feedback, or haptic feedback); and may receive inputs from users in any form (including acoustic inputs, voice inputs, or tactile inputs).

The systems and technologies described herein may be implemented in a computing system that includes back-end components (e.g., as a data server), or a computing system that includes middleware components (e.g., an application server), or a computing system that includes front-end components (e.g., a user computer with a graphical user interface or a web browser through which users may interact with implementations of the systems and technologies described herein), or a computing system that includes any combination of such back-end components, middleware components or front-end components. The components of the system may be interconnected by digital data communication (e.g., a communication network) in any form or medium. Examples of communication networks include: a local area network (LAN), a wide area network (WAN), and the Internet.

Computer systems may include clients and servers. The clients and servers are generally remote from each other and typically interacted through a communication network. The relationship of clients and servers arises by virtue of computer programs running on the respective computers and having a client-server relationship to each other.

According to the technical solution of embodiments of the present application, by taking a syllable input sequence, a phoneme input sequence and a Chinese character input sequence of a current sample as inputs of an encoder of a model to be trained, encoded representations of the syllable input sequence, the phoneme input sequence and the Chinese character input sequence are obtained at an output end of the encoder; by fusing the encoded representations of the syllable input sequence, the phoneme input sequence and the Chinese character input sequence, a weighted combination of the syllable input sequence, the phoneme input sequence and the Chinese character input sequence is obtained; by taking the weighted combination of the syllable input sequence, the phoneme input sequence and the Chinese character input sequence as an input of an attention module, a weighted average of the weighted combination of the syllable input sequence, the phoneme input sequence and the Chinese character input sequence at each moment is obtained at an output end of the attention module; by taking the weighted average of the weighted combination of the syllable input sequence, the phoneme input sequence and the Chinese character input sequence at each moment as an input of a decoder of the model to be trained, a speech Mel spectrum of the current sample is obtained at an output end of the decoder. That is, the present application implements joint training of an encoder and a decoder of the model to be trained by inputting texts at the input end of the model to be trained and outputting speech at the output end of the model to be trained. Because the present application employs the technical means of fusing the syllable input sequence, phoneme input sequence and Chinese character input sequence, it overcomes the technical problem of poor speech synthesis effect in the prior art caused by only using syllable input sequence or phoneme input sequence or Chinese character input sequence, and further achieves the technical effect of effectively improving the pronunciation effect, providing high expressive and degree of naturalness Chinese synthetic speech for a speech product; and the technical solutions of embodiments of the present application are simple, convenient, easy to popularize, and have a more wide range of application.

It should be understood that various forms of processes shown above may be used to reorder, add, or delete steps. For example, each step described in this application may be performed in parallel, sequentially, or in different orders, as long as the desired results of the technical solutions disclosed in the present application may be achieved without limitations herein.

The above specific implementations do not constitute limitations on the protection scope of the present application. It should be understood for those skilled in the art that various modifications, combinations, sub-combinations, and substitutions may be made according to design requirements and other factors. Any modification, equivalent replacement and improvement made within the spirit and principle of the present application shall be contained in the protection scope of present application.

What is claimed is:

1. A computer-implemented method for training a speech synthesis model, comprising:

taking a syllable input sequence, a phoneme input sequence and a Chinese character input sequence of a current sample as inputs of an encoder of the speech synthesis model to be trained, to obtain encoded representations of the syllable input sequence, the phoneme input sequence and the Chinese character input sequence at an output end of the encoder by:
  inputting the syllable input sequence, the phoneme input sequence and the Chinese character input sequence to three independent convolution layer transformation modules, respectively;
  obtaining a convolutional-transformed syllable input sequence, a convolutional-transformed phoneme input sequence and a convolutional-transformed Chinese character input sequence at output ends of the three independent convolution layer transformation modules, respectively; and
  taking the convolutional-transformed syllable input sequence, the convolutional-transformed phoneme input sequence and the convolutional-transformed Chinese character input sequence as inputs of a sequence transformation neural network module, to obtain the encoded representations of the syllable input sequence, the phoneme input sequence and the Chinese character input sequence at an output end of the sequence transformation neural network module;
fusing the encoded representations of the syllable input sequence, the phoneme input sequence and the Chinese character input sequence, to obtain a weighted combination of the syllable input sequence, the phoneme input sequence and the Chinese character input sequence;
taking the weighted combination of the syllable input sequence, the phoneme input sequence and the Chinese character input sequence as an input of an attention module, to obtain a weighted average of the weighted combination of the syllable input sequence, the phoneme input sequence and the Chinese character input sequence at each moment at an output end of the attention module; and
taking the weighted average of the weighted combination of the syllable input sequence, the phoneme input sequence and the Chinese character input sequence at each moment as an input of a decoder of the model to be trained, to obtain a speech Mel spectrum of the current sample at an output end of the decoder; and
outputting, from a speaker, synthesized speech based on an output of the decoder.

2. The method according to claim 1, wherein taking the syllable input sequence, the phoneme input sequence and the Chinese character input sequence of the current sample as inputs of the encoder of the model to be trained, to obtain the encoded representations of the syllable input sequence, the phoneme input sequence and the Chinese character input sequence at the output end of the encoder, comprises:
  inputting the syllable input sequence, the phoneme input sequence and the Chinese character input sequence to a shared encoder; and
  obtaining the encoded representations of the syllable input sequence, the phoneme input sequence and the Chinese character input sequence at an output end of the shared encoder.

3. The method according to claim 1, prior to taking the syllable input sequence, the phoneme input sequence and Chinese character input sequence of the current sample as inputs of the encoder of the model to be trained, further comprising:
  converting phonemes, syllables and Chinese characters in the current sample into respective vector representations of a fixed dimension, respectively;
  converting vector representations of the syllables and the Chinese characters into vector representations having the same length as the vector representation of the phonemes, to obtain the syllable input sequence, the phoneme input sequence and the Chinese character input sequence, and
  performing the step of taking the syllable input sequence, the phoneme input sequence and the Chinese character input sequence as inputs of the encoder of the model to be trained.

4. The method according to claim 1, wherein,
the phoneme input sequence comprises: a tone input sequence, a rhotic accent input sequence, a punctuation input sequence and input sequences of 35 independent finals; the phoneme input sequence comprises 106 phoneme units; each phoneme unit comprises 106 bits, wherein a value of a significant bit in 106 bits is 1 and a value of a non-significant bit is 0; the Chinese character input sequence comprises: input sequences of 3000 Chinese characters; the syllable input sequence comprises: input sequences of 508 syllables.

5. A training apparatus for a speech synthesis model, comprising:
  at least one processors; and
  a memory communicatively connected with the at least one processor; wherein,
  the memory stores instructions executable by the at least one processor, the instructions are executed by the at least one processor, so that the at least one processor can execute the method comprising:
  taking a syllable input sequence, a phoneme input sequence and a Chinese character input sequence of a current sample as inputs of an encoder of a model to be trained, to obtain encoded representations of the syllable input sequence, the phoneme input sequence and the Chinese character input sequence at an output end of the encoder by
    inputting the syllable input sequence, the phoneme input sequence and the Chinese character input sequence to three independent convolution layer transformation modules, respectively and obtaining a convolutional-transformed syllable input sequence, a convolutional-transformed phoneme input sequence, and a convolutional-transformed Chinese character input sequence at output ends of the three independent convolution layer transformation modules, respectively; taking the convolutional-transformed syllable input sequence, the convolutional-transformed phoneme input sequence and the convolutional-transformed Chinese character input sequence as inputs of a sequence transformation neural network module, to obtain the encoded representations of the syllable input sequence, the phoneme input sequence and the Chinese character input sequence at an output end of the sequence transformation neural network module;
  fusing the encoded representations of the syllable input sequence, the phoneme input sequence and the Chinese character input sequence, to obtain a weighted combination of the syllable input sequence, the phoneme input sequence and the Chinese character input sequence; and taking the weighted combination of the syllable input sequence, the phoneme input sequence and the Chinese character input sequence as an input of an attention module, to obtain a weighted average of the weighted combination of the syllable input sequence, the phoneme input sequence and the Chinese character input sequence at each moment at an output end of the attention module; and taking the weighted average of the weighted combination of the syllable input sequence, the phoneme input sequence and the Chinese character input sequence at each moment as an input of a decoder of the model to be trained, to obtain a speech Mel spectrum of the current sample at an output end of the decoder; and outputting, from a speaker, synthesized speech based on an output of the decoder.

6. The apparatus according to claim 5, wherein taking the syllable input sequence, the phoneme input sequence and the Chinese character input sequence of the current sample as inputs of the encoder of the model to be trained, to obtain the encoded representations of the syllable input sequence, the phoneme input sequence and the Chinese character input sequence at the output end of the encoder, comprises:

inputting the syllable input sequence, the phoneme input sequence and the Chinese character input sequence to a shared encoder; and obtaining the encoded representations of the syllable input sequence, the phoneme input sequence and the Chinese character input sequence at an output end of the shared encoder.

7. The apparatus according to claim 5, wherein prior to taking the syllable input sequence, the phoneme input sequence and the Chinese character input sequence of the current sample as inputs of the encoder of the model to be trained, the method further comprises:

converting phonemes, syllables and Chinese characters in the current sample into respective vector representations of a fixed dimension, respectively; and converting vector representations of the syllables and the Chinese characters into vector representations having the same length as the vector representation of the phonemes, to obtain the syllable input sequence, the phoneme input sequence and the Chinese character input sequence;

performing the step of taking the syllable input sequence, the phoneme input sequence and the Chinese character input sequence as inputs of the encoder of the model to be trained.

8. The apparatus according to claim 5, wherein, the phoneme input sequence comprises: a tone input sequence, a rhotic accent input sequence, a punctuation input sequence and input sequences of 35 independent finals; the phoneme input sequence comprises 106 phoneme units; each phoneme unit comprises 106 bits, wherein a value of a significant bit in 106 bits is 1 and a value of a non-significant bit is 0; the Chinese characters input sequence comprises: input sequences of 3000 Chinese characters; the syllable input sequence comprises: input sequences of 508 syllables.

9. A non-transitory computer-readable storage medium having computer instructions stored, wherein, the computer instructions are used to cause a computer to execute the method comprising:

taking a syllable input sequence, a phoneme input sequence and a Chinese character input sequence of a current sample as inputs of an encoder of a model to be trained, to obtain encoded representations of the syllable input sequence, the phoneme input sequence and the Chinese character input sequence at an output end of the encoder by inputting the syllable input sequence, the phoneme input sequence and the Chinese character input sequence to three independent convolution layer transformation modules, respectively and obtaining a convolutional-transformed syllable input sequence, a convolutional-transformed phoneme input sequence, and a convolutional-transformed Chinese character input sequence at output ends of the three independent convolution layer transformation modules, respectively; taking the convolutional-transformed syllable input sequence, the convolutional-transformed phoneme input sequence and the convolutional-transformed Chinese character input sequence as inputs of a sequence transformation neural network module, to obtain the encoded representations of the syllable input sequence, the phoneme input sequence and the Chinese character input sequence at an output end of the sequence transformation neural network module;

fusing the encoded representations of the syllable input sequence, the phoneme input sequence and the Chinese character input sequence, to obtain a weighted combination of the syllable input sequence, the phoneme input sequence and the Chinese character input sequence; and taking the weighted combination of the syllable input sequence, the phoneme input sequence and the Chinese character input sequence as an input of an attention module, to obtain a weighted average of the weighted combination of the syllable input sequence, the phoneme input sequence and the Chinese character input sequence at each moment at an output end of the attention module; and taking the weighted average of the weighted combination of the syllable input sequence, the phoneme input sequence and the Chinese character input sequence at each moment as an input of a decoder of the model to be trained, to obtain a speech Mel spectrum of the current sample at an output end of the decoder; and outputting, from a speaker, synthesized speech based on an output of the decoder.

10. The non-transitory computer-readable storage medium according to claim 9, wherein taking the syllable input sequence, the phoneme input sequence and the Chinese character input sequence of the current sample as inputs of the encoder of the model to be trained, to obtain the encoded representations of the syllable input sequence, the phoneme input sequence and the Chinese character input sequence at the output end of the encoder, comprises:

inputting the syllable input sequence, the phoneme input sequence and the Chinese character input sequence to a shared encoder; and obtaining the encoded representations of the syllable input sequence, the phoneme input sequence and the Chinese character input sequence at an output end of the shared encoder.

11. The non-transitory computer-readable storage medium according to claim 9, wherein prior to taking the syllable input sequence, the phoneme input sequence and the Chinese character input sequence of the current sample as inputs of the encoder of the model to be trained, the method further comprises:

converting phonemes, syllables and Chinese characters in the current sample into respective vector representations of a fixed dimension, respectively; and converting vector representations of the syllables and the Chinese characters into vector representations having the same length as the vector representation of the phonemes, to obtain the syllable input sequence, the phoneme input sequence and the Chinese character input sequence;

performing the step of taking the syllable input sequence, the phoneme input sequence and the Chinese character input sequence as inputs of the encoder of the model to be trained.

12. The non-transitory computer-readable storage medium according to claim 9, wherein, the phoneme input sequence comprises: a tone input sequence, a rhotic accent input sequence, a punctuation input sequence and input sequences of 35 independent finals; the phoneme input sequence comprises 106 phoneme units; each phoneme unit comprises 106 bits, wherein a value of a significant bit in 106 bits is 1 and a value of a non-significant bit is 0; the Chinese characters input sequence comprises: input sequences of 3000 Chinese characters; the syllable input sequence comprises: input sequences of 508 syllables.

\* \* \* \* \*